Figure 1:
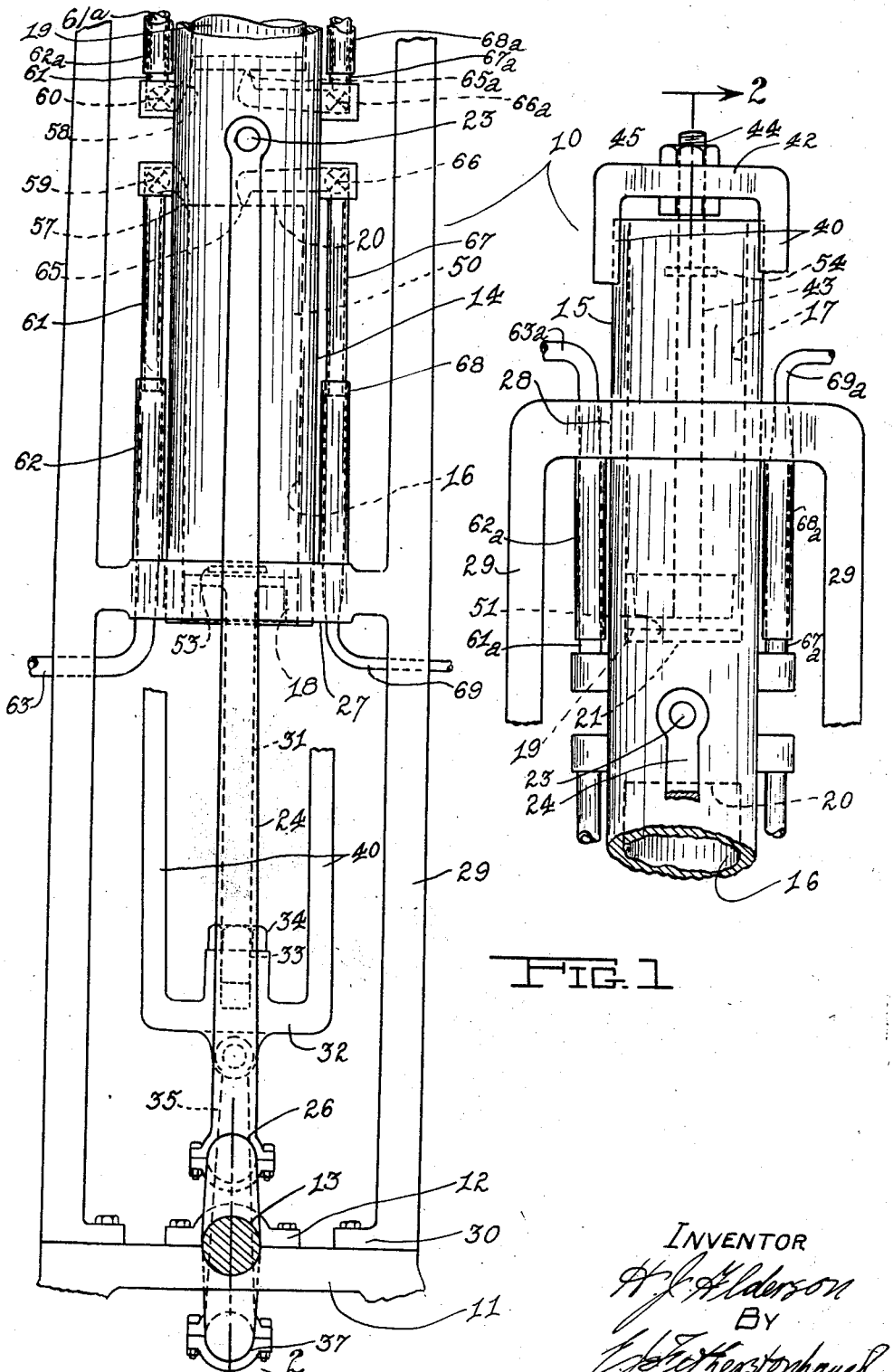

Nov. 18, 1930.   H. J. ALDERSON   1,781,831
RECIPROCATING ENGINE
Filed Jan. 9, 1929   2 Sheets-Sheet 1

INVENTOR
H. J. Alderson
BY
Fetherstonhaugh
ATTORNEY

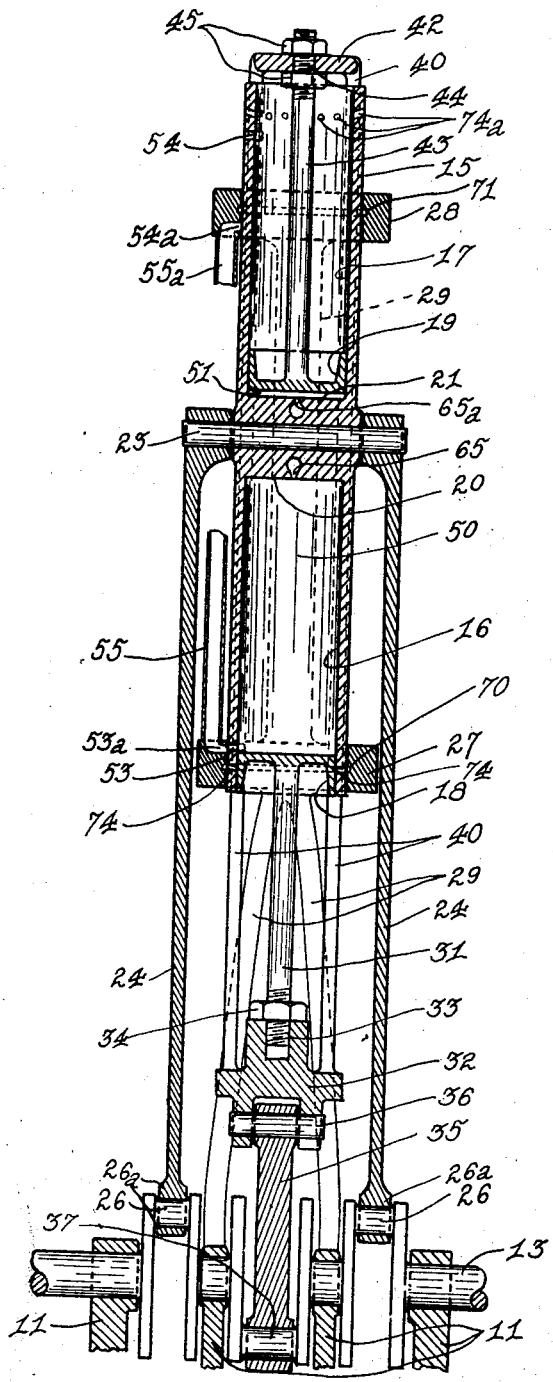

Patented Nov. 18, 1930

1,781,831

UNITED STATES PATENT OFFICE

HERBERT JAMES ALDERSON, OF TORONTO, ONTARIO, CANADA, ASSIGNOR OF FORTY-FIVE PER CENT TO JAMES LEGGE, OF LAMPTON PARK, ONTARIO, CANADA

RECIPROCATING ENGINE

Application filed January 9, 1929. Serial No. 331,243.

This invention relates to new and useful improvements in reciprocating engines, as described in the present specification and illustrated in the accompanying drawings which form part of same.

The invention consists essentially of the novel features pointed out broadly and specifically in the claims for novelty following a description containing an explanation in detail of an acceptable form of the invention.

Hitherto in the construction of reciprocating engines, it has invariably been the practice to make the cylinder member rigid in respect to the frame in which the crank shaft is journalled. This style of engine was more or less cumbersome, inasmuch as the cylinder members were necessarily heavy, particularly in the case of the internal combustion motor, to prevent undue vibration when fuels were exploded in the cylinder. A certain amount of energy developed by said explosion of fuels was lost due to incomplete expansion and to the absorption of power by vibration and other causes. The developed energy was invariably transmitted by a connecting rod or its equivalent from the piston to a single crank on the crank shaft. This method of transmitting energy at a single point to the crank shaft tends to set up internal strains and stresses necessitating an extremely heavy shaft and heavy bearings to carry same.

In my invention, the cylinders reciprocate as well as the pistons, each being connected to the crank shaft by means of pivoted connecting rods or their equivalent, and so arranged in relation to the cranks on the crank shaft that when the piston reciprocates towards said shaft, the cylinder will reciprocate away from it.

The energy developed by the expansion of exploded fuel gases or other gases tends to exert the same force on the piston as it does on the cylinders and we have a balanced turning effort on the crank shaft, that is the pulling effort on one crank is equal to the pushing effort on the opposite crank so that there is very little vibration in the crank shaft and an even flow of power is arrived at, thus rendering unnecessary cumbersome crank shafts and relieving bearing strain. The full shock of the exploded fuels is absorbed in the moving members and not dampened in any way by heavy cylinder blocks or the like.

The chief objects of this invention therefore, are to materially reduce the weight of the engine by eliminating heavy stationary cylinder blocks and heads; to simplify the design, thereby affording a greater accessibility to all moving parts, by eliminating to a great extent intricate and costly valve gears and mechanisms and ignition systems; to reduce vibration and running noises by the construction of a better balanced engine producing a more even flow of power and by eliminating to a great extent side thrust of the piston against the cylinder walls; to increase the efficiency of the motor by so arranging the cylinders and pistons that the full force of the explosion of fuels or the expansion of gases in the expansion chamber will be transmitted to the crank shaft to exert a turning effort thereon; to double the length of the explosion or compression stroke of the pistons in the cylinders without increasing the throw of the cranks on the crank shaft, thereby increasing the compressing powers of the pistons in the cylinders and to ensure a more complete expansion of the gases in said cylinders before exhaustion; to effect a more even distribution of power to the crank shaft by the transmission of the energy developed in the cylinder thereto at two or more opposing points on said shaft, thus reducing internal strains and stresses in said shaft; and generally to provide such an engine at a reduced cost, economical in operation and maintenance, requiring a minimum floor space and that may be utilized in the development of power in practically any machine, and that is capable of accomplishing the aforesaid results and purposes.

In the drawings, Figure 1 is a fragmentary end elevational view of an engine made in accordance with this invention.

Figure 2 is a sectional view taken on lines 2—2 in Figure 1.

Like numerals of reference indicate corresponding parts in the various figures.

Referring to the drawings, the numeral 10 indicates the device complete. 11 is the base portion or frame on which the engine 10 is supported and which carries the main bearings 12 for the crank shaft 13. 14 and 15 are opposed cylindrical members bored from opposite ends to form cylindrical chambers 16 and 17, respectively, in which pistons 18 and 19 reciprocate. The cylinders 14 and 15 are preferably cast integral with each other and with a common axis. The bored portion 16 terminates in the head 20 and the bored portion 17 terminates in the head 21. The heads 20 and 21 are adjacent each other and are preferably formed integral with each other, substantially as shown in Figures 1 and 2. The cylinder members 14 and 15 and the heads 20 and 21 are preferably cast integral or may be assembled in the different parts, as desired, and are supported on the pin 23 journalled or secured between the heads 20 and 21. Connecting rods 24 are mounted at either end of the pin 23 and extend downwardly therefrom to the crank throws 26 of the crank shaft 13 and are connected thereto at the bearings 26A. In some cases it may be more convenient to fix the pin 23 between the heads 20 and 21 and pivotally mount the connecting rods 24 thereupon or to pivotally mount the rods 24 to some other portion of the cylinder members 14 or 15 and this may be done without materially changing the construction or principle of the invention.

The cylinder members 14 and 15 are reciprocally mounted in rings 27 and 28 respectively, carried on the rigid framework 29 secured to the base 11 as at 30 or cast integral therewith. The piston 18 is connected through the rod 31 to a plate 32. The rod 31 is made adjustable in regard to the plate 32 as at 33 and so that the distance of the piston 18 from said plate 32 may be properly adjusted and fixed by the lock nut 34.

A connecting rod 35 is pivoted at the upper end on a pin 36 carried on the underside of the plate 32. The connecting rod 35 is pivotally connected to the crank throw 37 opposite the crank throw 26 of the crank shaft 13. Rods or bars 40 are formed integral with the plate 32 or otherwise secured thereto, extend upwardly to a web 42 and are formed integral therewith or otherwise secured thereto. The piston 19 has the rod 43 secured thereto extending upwardly and adjustably secured to the plate 42 as at 44. The piston 19 may be adjusted in regard to the plate 42 by the securing nuts 45 or in any other well known manner. The rods 40 are preferably reciprocally mounted in the ring 27 in such a manner that said ring will form a guide to take up the side thrust from the connecting rod 35 or from other sources. If deemed advisable, a guide separate from the ring 27 may be used to reciprocally mount the rods 40. Lubricating oil may be delivered to the bearings of the crank shaft 13 and the connecting rods in the usual manner, and to the outer surface of the cylinder members 14 and 15 through inner peripheral grooves 70 and 71 formed in the rings 27 and 28, respectively.

The oil may be carried to said grooves 70 and 71 in any of the well known methods such as gravity feed or force feed. Openings 74 and 74A are formed through the walls of the cylinder members 14 and 15, respectively, and serve to carry the oil from said grooves 70 and 71 to the pistons 18 and 19, respectively, when said pistons have reached the end of the explosion stroke.

The pistons 18 and 19 are so mounted and spaced in regard to each other that when the piston 18 is at the bottom of the stroke or at its extreme position distant from the head 20 of the cylinder member 14, the piston 19 is at a position adjacent the head 21 of the cylinder 15. The cylinder members 14 and 15 being formed integral with or fixed to each other and being pivotally mounted to the connecting rod 24 connected to the throw or crank 26 of the crank shaft 13, reciprocate in the rings 27 and 28 as the shaft 13 rotates.

The crank 26 being on the opposite side of the shaft from the crank 37 to which the rod 35 is connected, the cylinder members 14 and 15 will travel in an opposite direction to the pistons 18 and 19 which respectively reciprocate therein. It is to be noted that the relative travel or stroke of the pistons 18 and 19 in the cylinder members 14 and 15, respectively, is twice the diameter of the crank throw.

An explosion chamber 50 is formed in the cylindrical opening 16 between the piston 18 and the head 20 and an explosion chamber 51 is formed in the cylindrical opening 17 between the piston 19 and the head 21. An exhaust port 53, or a plurality of exhaust ports, are formed from the chamber 16 and so situated that the piston 18 will uncover said port or ports when said piston has reached its extreme position distant from the head 20, or in other words, when the piston has reached the end of the explosion stroke. A similar exhaust port or ports 54 are formed from the chamber 17 and similarly situated in regard to the piston 19. A port or a plurality of ports 53A are formed in the ring 27 and said ring is so fixed on the frame 29 that the port or ports 53A will register or coincide with the port or ports 53 at the end of the explosion stroke of the piston 18 in the chamber 16. The port or ports 53A are connected to a suitable exhaust pipe 55.

A port or ports 54A are formed in the ring 28 and said ring is so situated on the frame 29 that said port or ports 54A will register on the port or ports 54 when the piston 19 has completed the explosion stroke in the chamber 17. The port or ports 54A are connected to a suitable exhaust pipe 55A.

Scavenger or fresh air is admitted to the chambers 16 and 17 through orifices or ports 57 and 58, respectively, formed in the heads 20 and 21, respectively. A valve 59 operated in any of the well known methods by cams or rocker arms suitably timed and actuated, may be utilized to open or close the orifice 57 at the proper time for admitting air to the chamber 16. A similar valve 60 similarly operated may be utilized to open and close the orifice 58.

The fresh air is led to the opening 57 through a pipe 61 fixed to the cylinder member 14 and telescoping in the pipe 62 fixed to the ring 27 and connecting through the pipe 63 with a pressure storage tank or suitable compressing pump or the like. The fresh air is similarly led to the orifice 58 through the pipe 61A connected thereto and telescoping in the pipe 62A carried on the ring 28 and connected to the pipe 63A leading to suitable compressing pumps or the like.

The fuel is admitted into the chamber 16 through the orifice 65 centrally located in the head 21. A suitable valve 66 is actuated in any of the well known ways by cams or rocker arms suitably timed and serves to open or close the orifice 65 at the proper time for admitting fuel to the chamber 16. The fuel is led to the orifice 65 through a pipe 67 connected thereto and telescoping in a pipe 68 rigidly carried on the ring 27 and connected by the pipe 69 to the source of fuel supply. Fuel is similarly admitted to the chamber 17 through the centrally located orifice 65A in the head 21 and a valve 66A similarly actuated to the valve 65 may be utilized to close or open the orifice 65A at the proper time. Fuel is led to the orifice 65A through the pipe 67A telescoping in the pipe 68A carried by the ring 28 and connected through the pipe 69A to a source of fuel supply. The pipes 67 and 67A telescoping into the pipes 68 and 68A, respectively, act as pumps to compress the fuel and force it under pressure through the orifice 65 and 65A, respectively.

In the operation of this invention, the pistons 18 and 19 and the cylinder members 14 and 15 reciprocate in relation to the frame 29 and the base 11 towards and away from the crank shaft 13. The pistons 18 and 19 being fixed in relation to each other and connected through the pivoted connecting rod 35 to the crank 37 reciprocates in an opposite direction to the cylinder members 14 and 15 which are connected through a pivoted connecting rod or rods 24 to the crank 26 in opposite relationship to said crank 37 on said crank shaft 13. The rings 27 and 28 reciprocally mount the cylinder members 14 and 15 and serve to prevent rotation of said cylinders about the crank shaft. This method of connecting the cylinders and pistons to the crank shaft doubles the stroke of the pistons 18 and 19 in the cylinder recesses 16 and 17, respectively, without increasing the crank throw of the crank shaft 13, thus allowing for a greater compression of the fuels in the chambers 50 and 51 and for a more complete expansion of the burnt gases and the like before exhaustion by way of the posts 53 and 54 at the end of the strokes of the pistons 18 and 19, respectively. This method of mounting also serves to equalize the turning effort on all sides of the crank shaft 13, thus eliminating to a great extent internal stresses and strains in the shaft 13 itself and reduces the strains and end thrust on the bearings 12. The engine in this case is disclosed as arranged for use as a two-cycle Diesel engine in which the fuel gases are exploded by compression and in which there is an explosion stroke in each cylinder in one revolution of the crank shaft.

In this case it is to be noted that when compression is taking place in the chamber 50 the explosion and expansion of the gases is taking place in the chamber 51 and the piston 19 will be forced away from the crank shaft 13 while the cylinder 15 is being projected towards said shaft. The opposite action takes place when the gases are exploded and expended in the chamber 50; the piston 18 in this case is forced towards the crank shaft 13 while the cylinder member 14 is forced away from same. Thus, for one complete revolution of the crank shaft 13 there will be four direct impulses on the crank shaft, two delivered through the connecting rod 35 from the pistons 18 and 19, one impulse being towards the cylinders 14 and 15 and one away from said cylinders, and similarly two delivered through the connecting rod or rods 24 from the cylinder members 14 and 15. Thus a fairly continuous torque or turning effort is exerted on the shaft 13.

As stated above, this invention is disclosed for the sake of convenience as being adapted for operation as a two cycle so called Deisel engine, but it is to be understood that this arrangement of pistons and cylinders could readily be adapted for use as a four cycle Deisel or other internal combustion engine or even as a steam expansion engine without going beyond the scope of this invention as set forth and claimed by me.

What I claim is:

1. In reciprocating engines, a female piston forming combustion chambers on either side and male pistons reciprocating in said chambers, inlet and exhaust ports in said female piston, and a crankshaft connected to said female and male pistons.

2. In reciprocating engines, a female piston forming combustion chambers on either side and male pistons reciprocating in said chambers, inlet ports in said female piston and operated thereby and exhaust ports in said female piston controlled by the movements thereof together with said male pistons, and a crankshaft connected to said female and male pistons.

3. In reciprocating engines, a female piston forming combustion chambers on either side and male pistons reciprocating in said chambers, inlet and exhaust ports in said female piston, and a crankshaft connected to said female and male pistons causing the female piston to reciprocate in the opposite direction to the movement of the male pistons.

4. In reciprocating engines, stationary rings having rods journalled on a crankshaft and having exhaust ports, a female piston forming combustion chambers on either side and slidable in said rings and connected to crank throws on said crankshaft and having inlet ports, and male pistons reciprocating in said chambers and connected to an opposite crank throw on said crankshaft.

Signed at the city of Toronto, this 20th day of December, 1928.

HERBERT JAMES ALDERSON.